United States Patent
Oh et al.

(10) Patent No.: US 12,400,105 B2
(45) Date of Patent: Aug. 26, 2025

(54) ELECTRONIC APPARATUS AND CONTROL METHOD THEREOF

(71) Applicant: SAMSUNG ELECTRONICS CO., LTD., Suwon-si (KR)

(72) Inventors: Seongwoo Oh, Suwon-si (KR); Yeonggyo Yoon, Suwon-si (KR); Jinyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 18/216,295

(22) Filed: Jun. 29, 2023

(65) Prior Publication Data

US 2023/0345111 A1 Oct. 26, 2023

Related U.S. Application Data

(63) Continuation of application No. PCT/KR2021/018405, filed on Dec. 7, 2021.

(30) Foreign Application Priority Data

Jan. 26, 2021 (KR) .......................... 10-2021-0010600

(51) Int. Cl.
*H04N 23/63* (2023.01)
*G06T 7/194* (2017.01)
(Continued)

(52) U.S. Cl.
CPC ........... *H04N 23/632* (2023.01); *G06T 7/194* (2017.01); *G06V 10/462* (2022.01); *G06V 10/82* (2022.01); *H04N 23/633* (2023.01)

(58) Field of Classification Search
CPC .... H04N 23/632; H04N 23/633; H04N 23/45; H04N 23/61; H04N 23/698;
(Continued)

(56) References Cited

U.S. PATENT DOCUMENTS 7,167,203 B1 * 1/2007 Yukawa ................. G03B 13/18
348/E5.045
8,885,890 B2 * 11/2014 Tardif ....................... G06T 5/70
382/106
(Continued)

FOREIGN PATENT DOCUMENTS

CN 113727025 A * 11/2021
CN 113645408 B * 4/2023
(Continued)

OTHER PUBLICATIONS

Communication dated May 2, 2024, issued by the European Patent Office in counterpart European Application No. 21923415.0.
(Continued)

*Primary Examiner* — Chiawei Chen
(74) *Attorney, Agent, or Firm* — Sughrue Mion, PLLC

(57) ABSTRACT

An electronic apparatus includes a camera including a first lens and a second lens capable of obtaining an image having an angle of view different from the first lens, a display, a memory, and a processor. To perform a controlling method, the processor is configured to provide a first image obtained using the first lens to the display as a live view, obtain a second image using the second lens, obtain image information regarding the second image and object information regarding at least one object depicted in the second image using at least one neural network model, identify a screen type of the second image based on the image information and the object information, identify a set of filters corresponding to the screen type of the second image, and correct the first image based on the identified set of filters to provide a corrected first image as the live view.

18 Claims, 18 Drawing Sheets

(51) Int. Cl.
*G06V 10/46* (2022.01)
*G06V 10/82* (2022.01)

(58) Field of Classification Search
CPC ......... H04N 23/951; G06T 7/194; G06T 5/00;
G06T 5/10; G06T 2207/20084; G06V
10/462; G06V 10/82; G06V 10/26; G06V
20/64; G06N 3/045; G06N 3/08
See application file for complete search history.

(56) References Cited

U.S. PATENT DOCUMENTS

| | | | |
|---|---|---|---|
| 9,384,556 B2 * | 7/2016 | Mazurenko | G06V 10/426 |
| 9,716,825 B1 * | 7/2017 | Manzari | G06F 3/04883 |
| 9,813,615 B2 | 11/2017 | Lee et al. | |
| 10,027,905 B2 | 7/2018 | Salin et al. | |
| 10,200,623 B1 * | 2/2019 | Baldwin | H04N 23/63 |
| 10,638,115 B2 | 4/2020 | Sasatani et al. | |
| 10,701,274 B2 | 6/2020 | Tsubusaki | |
| 10,896,350 B2 | 1/2021 | Tsuji | |
| 11,073,973 B2 | 7/2021 | Lee et al. | |
| 11,076,087 B2 | 7/2021 | Kim et al. | |
| 2018/0082715 A1 | 3/2018 | Rymkowski et al. | |
| 2018/0293745 A1 * | 10/2018 | Ha | G06T 7/12 |
| 2019/0236794 A1 * | 8/2019 | Nash | H04N 23/45 |
| 2019/0317594 A1 | 10/2019 | Stent | |
| 2020/0053276 A1 | 2/2020 | Kim et al. | |
| 2020/0285308 A1 | 9/2020 | Pepperell et al. | |
| 2020/0344411 A1 | 10/2020 | Cragg et al. | |
| 2021/0012516 A1 * | 1/2021 | Kang | G06T 5/70 |
| 2021/0368094 A1 * | 11/2021 | Li | H04N 23/633 |

FOREIGN PATENT DOCUMENTS

| | | |
|---|---|---|
| EP | 3 654 625 A1 | 5/2020 |
| EP | 3 531 370 B1 | 5/2021 |
| JP | 2020-201772 A | 12/2020 |
| KR | 10-2010-0037392 A | 4/2010 |
| KR | 10-2018-0051367 A | 5/2018 |
| KR | 10-2020-0017299 A | 2/2020 |

OTHER PUBLICATIONS

Communication dated Mar. 18, 2022, issued by the International Searching Authority in counterpart International Application No. PCT/KR2021/018405 (PCT/ISA/210).

Communication dated Mar. 18, 2022, issued by the International Searching Authority in counterpart International Application No. PCT/KR2021/018405 (PCT/ISA/237).

Carter et al., "What is an AI camera? How AI is changing photography and photo editing . . . ," The Home of Digital Photography, https://www.digitalcameraworld.com/features/what-is-an-ai-powered-camera, Last updated Jul. 2, 2021, Total 21 pages.

"Huawei P40 Series | 5G," Retrieved at https://consumer.huawei.com/en/campaign/p40/sophisticated-camera-system/ on Sep. 22, 2020, Total 14 pages.

"Samsung Galaxy Z Fold4," Retrieved at https://www.samsung.com/global/galaxy/what-is/scene-optimizer/ on Sep. 22, 2020, Total 22 pages.

Communication issued Oct. 18, 2024 by the Korean Intellectual Property Office in Korean Patent Application No. 10-2021-0010600.

* cited by examiner

FIG. 6

| SCREEN TYPE/FILTER | SATURATION | BRIGHTNESS | WHITE BALANCE | GAMMA CORRECTION | ..... |
|---|---|---|---|---|---|
| MOUNTAIN | INCREASE | - | 5600K | 1.1 | |
| OFFICE | - | INCREASE | 4000K | 1.2 | |
| FIGURE | - | INCREASE | 5500K | 1.3 | |
| ..... | | | | | |

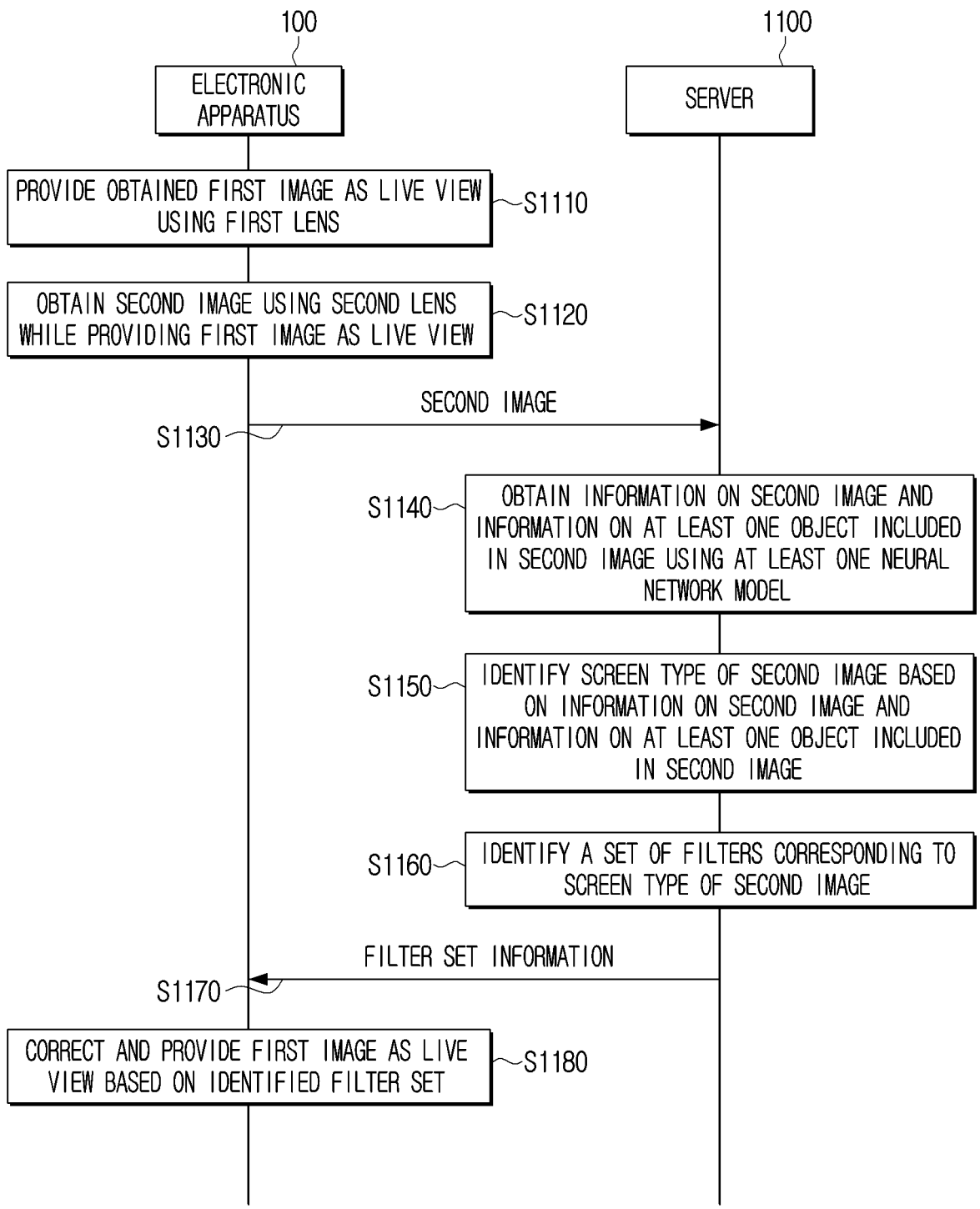

ELECTRONIC APPARATUS AND CONTROL METHOD THEREOF

CROSS-REFERENCE TO RELATED APPLICATIONS

This application is a bypass continuation application of International Patent Application No. PCT/KR2021/018405, filed on Dec. 7, 2021, which is based on and claims priority to Korean Patent Application No. 10-2021-0010600, filed on Jan. 26, 2021 with the Korean Intellectual Property Office, the disclosures of each of which are incorporated by reference herein in their entireties.

BACKGROUND

1. Field

This disclosure relates to an electronic apparatus and a controlling method thereof and more particularly, to an electronic apparatus that identifies a screen type of a currently captured image and correcting a screen using a set of filters corresponding to the identified screen type and a controlling method thereof.

2. Description of Related Art

Recently, photos are taken through electronic apparatuses such as smartphones as well as cameras. An electronic apparatus not only has a photo taking function but also provides various filters to improve the quality of photos. For example, an electronic apparatus provides a technology of analyzing an image and proposing an optimal filter set corresponding to a screen type. In other words, based on the type of a currently captured screen being "restaurant", an electronic apparatus may correct the captured image using a set of filters corresponding to the restaurant, and based on the type of a currently captured screen being "person", the electronic apparatus may correct the captured image using a set of filters corresponding to the person.

However, in the case of a prior art electronic apparatus, it often does not understand the overall configuration of a screen based on determining a set of filters for correcting an image, ending up providing a set of filters corresponding to a type that a user does not want.

In addition, since the prior art electronic apparatus determines the type of screen based on a single object, based on multiple objects being included in a captured image, it often finds it difficult to determine the type of screen. Accordingly, in order to prevent misrecognition, in many cases, the electronic apparatus determines "No detect" in which a set of filters are not provided.

Further, based on an area of the screen obtained during image capturing being narrow, it may be difficult to determine the type of screen due to the limited angle of view.

Therefore, a method of accurately determining the type of screen included in an image and providing a set of filters corresponding to the type of screen is required.

SUMMARY

The present disclosure is to provide an electronic apparatus that may identify a type of screen more accurately based on a relationship between objects in an image captured using a plurality of lenses and correct the captured image based on a set of filters corresponding to the identified type of screen and a controlling method thereof.

According to an embodiment, an electronic apparatus includes a camera including a first lens and a second lens capable of obtaining an image having an angle of view different from the first lens, a display, a memory, and a processor. The processor is configured to provide a first image obtained using the first lens to the display as a live view, obtain a second image using the second lens while providing the first image as the live view, obtain image information regarding the second image and object information regarding at least one object depicted in the second image using at least one neural network model, identify a screen type of the second image based on the image information and the object information, identify a set of filters corresponding to the screen type of the second image, and correct the first image based on the identified set of filters to provide a corrected first image as the live view.

The image information may include depth map information corresponding to the second image and saliency information corresponding to the second image, and the processor may be further configured to obtain the depth map information by inputting the second image to a first neural network model, and obtain the saliency information by inputting the second image to a second neural network model.

The object information may include at least one of type information of the at least one object, three-dimensional location information of the at least one object, area information regarding an area where the at least one object is located, and posture information of the at least one object. The processor may be further configured to perform at least one of: obtain segmentation information in which the at least one object and a background included in the second image are segmented by inputting the second image to a third neural network model, obtain the type information by inputting the second image to the third neural network mode, obtain at least one of the three-dimensional location information and the area information based on the segmentation information and the depth map information, and obtain the posture information by inputting information regarding the at least one object included in the segmentation information to a fourth neural network model.

The processor may be further configured to obtain relationship information between a plurality of objects depicted in the second image including the at least one object by inputting the three-dimensional location information and the area information of each object of the plurality of objects to a fifth neural network model.

The processor may be further configured to obtain heat map information corresponding to corrected saliency information by inputting the relationship information, the posture information of the at least one object, focus information regarding the second image, and the saliency information to a sixth neural network model.

The processor may be further configured to identify the screen type of the second image based on the second image, the heat map information and the type information of the at least one object.

The memory may store a plurality of sets of filters respectively corresponding to a plurality of screen types. The processor may be further configured to identify the set of filters corresponding to the screen type of the second image from among the plurality of sets of filters.

The processor may be further configured to control the display to provide information regarding the screen type on the live view together with the corrected first image.

The second lens may be capable of obtaining an image having a wider angle of view than the first lens.

According to an embodiment, a controlling method of an electronic apparatus, which includes a camera including a first lens and a second lens capable of obtaining an image having a wider angle of view than the first lens, includes providing a first image obtained using the first lens as a live view, obtaining a second image using the second lens while providing the first image as the live view, obtaining image information regarding the second image and object information regarding at least one object depicted in the second image using at least one neural network model, identifying a screen type of the second image based on the image information and the object information, identifying a set of filters corresponding to the screen type of the second image, and correcting the first image based on the identified set of filters to provide a corrected first image as the live view.

The image information may include depth map information corresponding to the second image and saliency information corresponding to the second image. The obtaining of the image information may include obtaining the depth map information by inputting the second image to a first neural network model, and obtaining the saliency information by inputting the second image to a second neural network model.

The object information may include at least one of type information of the at least one object, three-dimensional location information of the at least one object, area information regarding an area where the at least one object is located, and posture information of the at least one object. The obtaining of the object information may include at least one of: obtaining segmentation information in which the at least one object and a background included in the second image are segmented by inputting the second image to a third neural network model, obtaining the type information by inputting the second image to the third neural network model, obtaining at least one of the three-dimensional location information and the area information based on the segmentation information and the depth map information, and obtaining the posture information by inputting information regarding the at least one object included in the segmentation information to a fourth neural network model.

The identifying of the screen type of the second image may include obtaining relationship information between a plurality of objects depicted in the second image comprising the at least one object, by inputting the three-dimensional location information and the area information of each object of the plurality of objects to a fifth neural network model.

The identifying of the screen type of the second image may include obtaining heat map information corresponding to corrected saliency information by inputting the relationship information, the posture information of the at least one object, focus information regarding the second image, and the saliency information to a sixth neural network model.

The identifying of the screen type of the second image may be based on the second image, the heat map information, and the type information of the at least one object.

The electronic apparatus may store a plurality of sets of filters respectively corresponding to a plurality of screen types. The set of filters may be identified from among the plurality of sets of filters.

The method may further include providing information regarding the screen type on the live view together with the corrected first image.

The second lens may be capable of obtaining an image having a wider angle of view than the first lens.

According to the above-described various embodiments, an electronic apparatus may identify the type of screen of a currently captured screen more accurately to provide an accurate screen filter effect on the currently captured image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a view illustrating a filter set database stored in an electronic apparatus according to an embodiment;

FIG. 11 is a sequence view illustrating a method of an electronic apparatus correcting an image in association with a server according to an embodiment.

DETAILED DESCRIPTION

Figure 1:
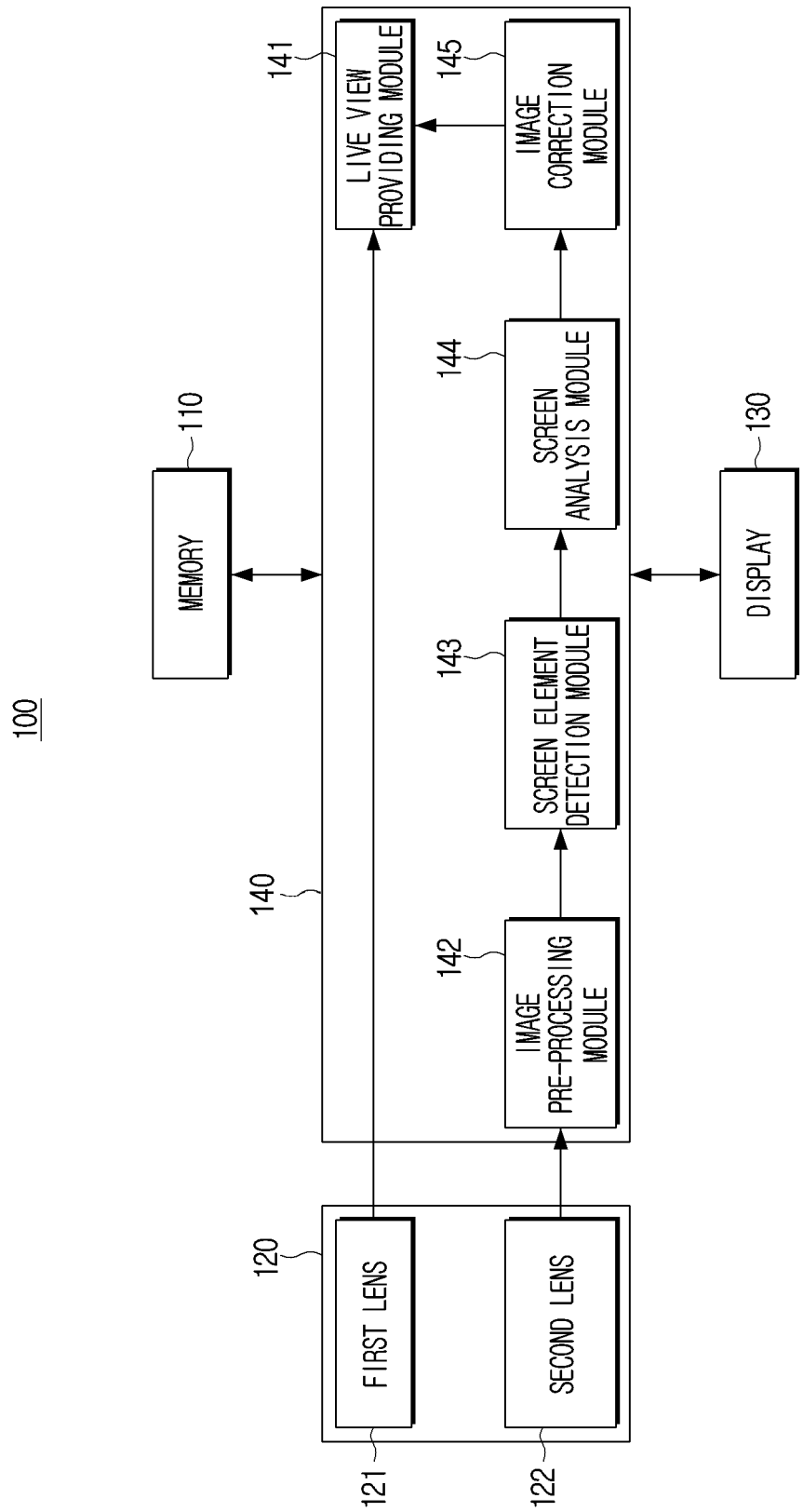
FIG. 1 is a block diagram illustrating components of an electronic apparatus according to an embodiment.

The present embodiments may be variously modified and have various embodiments, and specific embodiments of the present disclosure will be shown in the drawings and described in detail in the detailed description. However, it is to be understood that the present disclosure is not limited to the specific embodiments, and includes all modifications, equivalents, and alternatives. In connection with the description of the drawings, like reference numerals may be used for like components.

In describing the present disclosure, when it is decided that a detailed description for the known art related to the present disclosure may obscure the gist of the present disclosure, the detailed description will be omitted.

In addition, the following embodiments may be modified in many different forms, and the scope of the technical spirit of the present disclosure is not limited to the following embodiments. Rather, these embodiments are provided so that the disclosure will be more through and complete and the technical sprit of the present disclosure is fully conveyed to those skilled in the art.

Terms used in this disclosure are used only to describe specific embodiments, and are not intended to limit the scope of rights. Singular expressions include plural expressions unless the context clearly indicates otherwise.

In the disclosure, an expression "have," "may have," "include," or "may include" indicates existence of a corresponding feature (for example, a numerical value, a function, an operation, or a component such as a part), and does not exclude existence of an additional feature.

In the disclosure, an expression "A or B," "at least one of A and/or B," or "one or more of A and/or B," may include all possible combinations of items enumerated together. For example, "A or B," "at least one of A and B," or "at least one of A or B" may indicate all of 1) a case where at least one A is included, 2) a case where at least one B is included, or 3) a case where both of at least one A and at least one B are included.

Expressions "first" or "second" used in the disclosure may indicate various components regardless of a sequence and/or importance of the components, will be used only to distinguish one component from the other components, and do not limit the corresponding components.

When it is mentioned that any component (for example, a first component) is (operatively or communicatively) coupled to or is connected to another component (for example, a second component), it is to be understood that any component is directly coupled to another component or may be coupled to another component through the other component (for example, a third component).

On the other hand, when it is mentioned that any component (for example, a first component) is "directly coupled" or "directly connected" to another component (for example, a second component), it is to be understood that the other component (for example, a third component) is not present between any component and another component.

An expression "~configured (or set) to" used in the disclosure may be replaced by an expression "~suitable for," "~having the capacity to," "~designed to," "~adapted to," "~made to," or "~capable of" depending on a situation. A term "~configured (or set) to" does not necessarily mean "specifically designed to" in hardware.

Instead, in some situations, an expression "apparatus configured to" may mean that the apparatus may "do" together with other apparatuses or components. For example, a "sub-processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the disclosure, the term "module" or "unit" performs at least one function or operation, and may be embodied as hardware, software, or a combination thereof. A plurality of "modules" or a plurality of "units" may be integrated into at least one module to be implemented as one processor, except a "module" or "unit" which is described as embodied as particular hardware.

Meanwhile, various components and areas in the drawings are schematically drawn. Therefore, the technical spirit of the present disclosure is not limited by the relative size or spacing drawn in the accompanying drawings.

Meanwhile, the electronic apparatus according to an embodiment may include at least one of smartphones, tablet personal computers (PCs), desktop PCs, laptop PCs, or wearable devices. Here, the wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit.

According to some embodiments, the electronic apparatus may include at least one of televisions (TVs), digital video desk (DVD) players, audios, refrigerators, air-conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

Hereinafter, embodiments according to the present disclosure will be described in detail so that those skilled in the art can easily implement the present disclosure with reference to accompanying drawings.

Hereinafter, the present disclosure will be described in greater detail with reference to the drawings. FIG. 1 is a block diagram illustrating configuration of an electronic apparatus according to an embodiment. An electronic apparatus 100 includes a memory 110, a camera 120, a display 130, and a processor 140. In this case, the electronic apparatus 100 may be implemented as a smartphone. However, the electronic apparatus according to an embodiment is not limited to a specific type of device, and it may be implemented as various types of electronic apparatuses 100 such as a tablet PC, a digital camera, etc.

The memory 110 may store data used by a module for correcting an image according to a screen type of the image to perform various operations. Modules for correcting an image may include an image preprocessing module 142, a screen element detection module 143, a screen analysis module 144, an image correction module 145, and a live view providing module 141. In addition, the memory 110 may detect a screen element included in the image, and store a plurality of neural network models to determine a screen type based on the detected element.

Meanwhile, the memory 110 may include a non-volatile memory capable of maintaining stored information even if power supply is interrupted, and a volatile memory which uses a continuous power supply in order to maintain stored information. Data for performing various operations by a module for correcting an image according to a screen type of the image may be stored in a non-volatile memory. In addition, a plurality of neural network models may also be stored in the memory in order to detect a screen element included in the image and determine a screen type based on the detected element. Further, the memory 110 may store a plurality of filter sets corresponding to a plurality of screen types.

In addition, the memory 110 may include at least one buffer that temporarily stores a plurality of image frames obtained through each of a plurality of lenses included in the camera 120.

Figure 2:
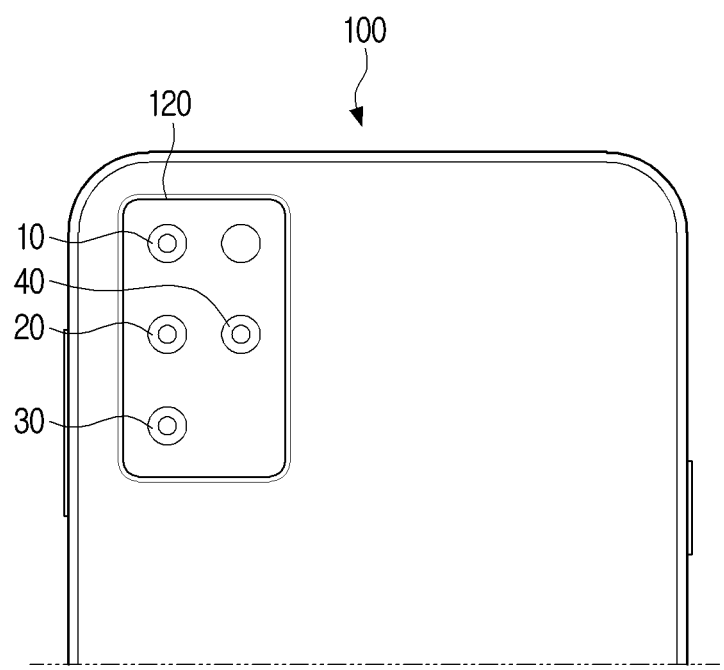
FIG. 2 is a partial view illustrating a camera of an electronic apparatus according to an embodiment.

The camera 120 may include a plurality of lenses that are different from each other (e.g., a first lens 121, a second lens 122). Here, the fact that the plurality of lenses are different from each other may include a case in which the field of view (FOV) of each of the plurality of lenses is different from each other and a case in which the positions of each of the plurality of lenses are different from each other. For example, as illustrated in FIG. 2, the camera 120 of the electronic apparatus 100 may include a telephoto lens 10, a wide angle lens 20 and an ultra wide angle lens 30, which are disposed on the back of the electronic apparatus 100, and it may also include a three dimensional depth lens 40. In addition to the telephoto lens 10, the wide angle lens 20 and the ultra wide angle lens 30 disposed on the back of the electronic apparatus 100, a telephoto lens (not illustrated) disposed on the front of the electronic apparatus 100 may be further included. In other words, there is no particular limit to the number and type of lenses according to the present disclosure. In this case, the telephoto lens 10 has a wider angle of view than a ultra telephoto lens, a standard lens has a wider angle of view than the telephoto lens 10, the wide angle lens 20 has a wider angle of view than the standard lens, and the ultra wide angle lens 30 has a wider angle of view than the wide angle lens 20. For example, the angle of view of the ultra telephoto lens may be 3 degrees to 6 degrees, the angle of view of the telephoto lens 10 may be 8 degrees to 28 degrees, the angle of view pf the standard lens may be 47 degrees, the angle of view of the wide angle lens 20 may be 63 degrees to 84 degrees, and the angle of view of the ultra wide angle lens 30 may be 94 degrees to 114 degrees.

As the angle of view of the lens is wide, an image frame obtained through the lens may include a relatively wide range of scenes, whereas the size of an object included (that is, depicted) in the image frame may be relatively small and an exaggeration of perspective may occur. Meanwhile, as the angle of view of the lens narrows, the image frame obtained through the lens may enlarge the size of the object and include the enlarged object, whereas only a relatively narrow range of scenes may be included.

However, for convenience of description, a case in which the camera 120 of the electronic apparatus 100 includes two lenses, the first lens 121 (e.g., a wide angle lens) and the second lens 122 (e.g., a ultra wide angle lens) will be mainly described.

In addition, the camera 120 may further include an Image Signal Processor (ISP) for processing signals obtained through a plurality of lenses in addition to the plurality of lenses.

The display 130 may display a live view of an image captured through the camera 120 (particularly, the first lens 121). In addition, the display 130 may further provide information on the screen type on the live view including the corrected first image.

Meanwhile, the display 130 may be implemented as a Liquid Crystal Display Panel (LCD), an Organic Light Emitting Diodes (OLED), etc., and the display 130 may also be implemented as a flexible display, a transparent display, etc. in some cases. However, the display 130 according to an embodiment is not limited to a specific type.

The processor 140 may be electrically connected to the memory 110 to control the overall functions and operations of the electronic apparatus 100.

Based on a camera application being executed or a user command for correcting image according to the type of screen is input, the processor 140 may load data for a module to perform various operations for correcting the image according to the screen type stored in a memory onto a volatile memory. Subsequently, the processor 140 may detect a screen element, and load a plurality of neural network models for determining the screen type according to the detected screen element onto the volatile memory. The processor 140 may perform various operations through various modules and neural network models based on the data loaded onto the volatile memory. Here, loading means an operation of loading and storing data stored in a non-volatile memory onto the volatile memory so that the processor 140 can access it.

In particular, based on a camera application being executed by a first user command, the processor 140 may obtain at least one image through the camera 120.

In particular, the processor 140 may obtain a first image through the first lens 121 included in the camera 120. The processor 140 may provide the first image obtained through the first lens 121 as a live view image through a live view providing module 141. In this case, the live view image is an image that is output to the display 130 immediately after the image input to a sensor included in the camera 120 is processed, and a user may adjust the composition, focus, exposure, etc. of the screen using the live view image.

While the first image obtained through the first lens 121 is provided as the live view image, the processor 140 may obtain a second image through the second lens 122 included in the camera 120. In this case, the second lens 122 is a lens capable of obtaining an image with a wider angle of view than the first lens 121. For example, the first lens 121 may be implemented as the wide angle lens 20, and the second lens 122 may be implemented as the ultra wide angle lens 30.

The processor 140 may perform preprocessing of the second lens obtained through the second lens using an image preprocessing module 142. In this case, the image preprocessing module 142 may resize the second image and normalize the brightness and contrast of the second image.

The processor 140 may detect a screen element included in the preprocessed second image using a screen element detection module 143. Specifically, the screen element detection module 143 may obtain information on the second image and information on at least one object included (that is, depicted) in the second image using at least one neural network model. In this case, the information on the second image may include depth map information corresponding to the second image, saliency information corresponding to the second image, and focus information of the second image. In addition, the information on at least one object included in the second image may include type information of the at least one object, three-dimensional position information of the at least one object, information on an area where the at least one object is located, and posture information of the at least one object.

Figure 3:
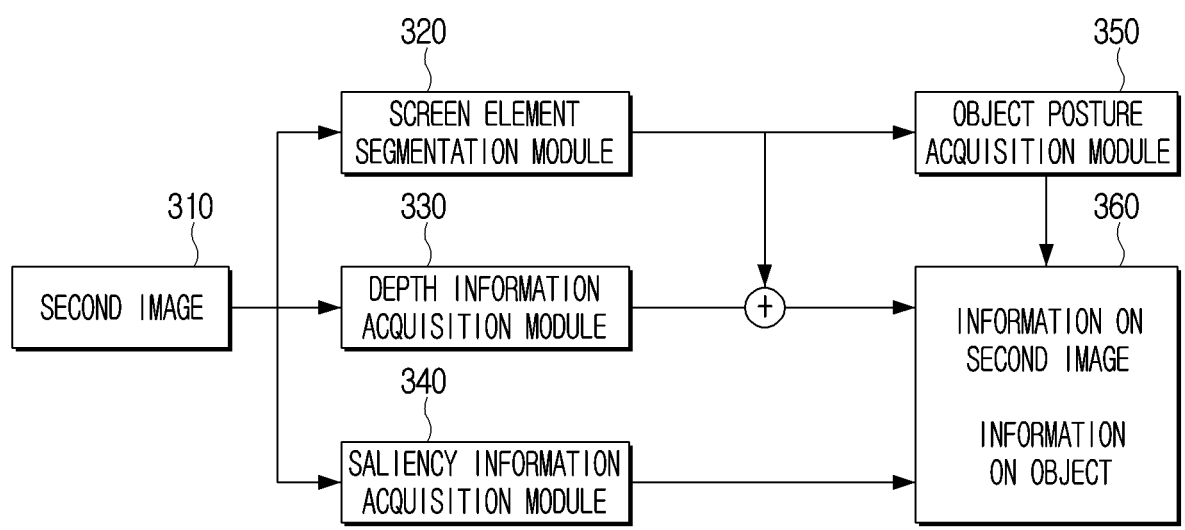
FIG. 3 is a view illustrating an operation of components included in a screen element detection module according to an embodiment.

A method in which the screen element detection module 143 obtains information on an image and information on an object using at least one module and a neural network model will be described with reference to FIG. 3. The screen element detection module 143 may include a screen element segmentation module 320, a depth information acquisition module 330, a saliency information acquisition module 340, and an object posture acquisition module 350 as illustrated in FIG. 3. These components may be used to process a second image 310.

The screen element segmentation module 320 may obtain segmentation information in which elements included in the second image 310 obtained through the second lens are segmented using a neural network model trained to segment screen elements. Here, the elements included in the second image 310 may include at least one object element and background element included in the second image 310. In particular, the screen element segmentation module 320 may segment screen elements through panoptic segmentation. Panoptic segmentation may obtain information on background elements (e.g., background area information, background type information, etc.) through semantic segmentation, and obtain information on each of at least one object element (e.g., location information of at least one object, area information of at least one object, type information of at least one object, etc.) through instance segmentation.

The depth information acquisition module 330 may obtain depth information corresponding to the second image 310 by inputting the second image 310 to a neural network model trained to obtain depth information of an image. In this case, the depth information indicates depth information of elements included in the second image 310, and may be expressed in gray scale.

Figure 4A:
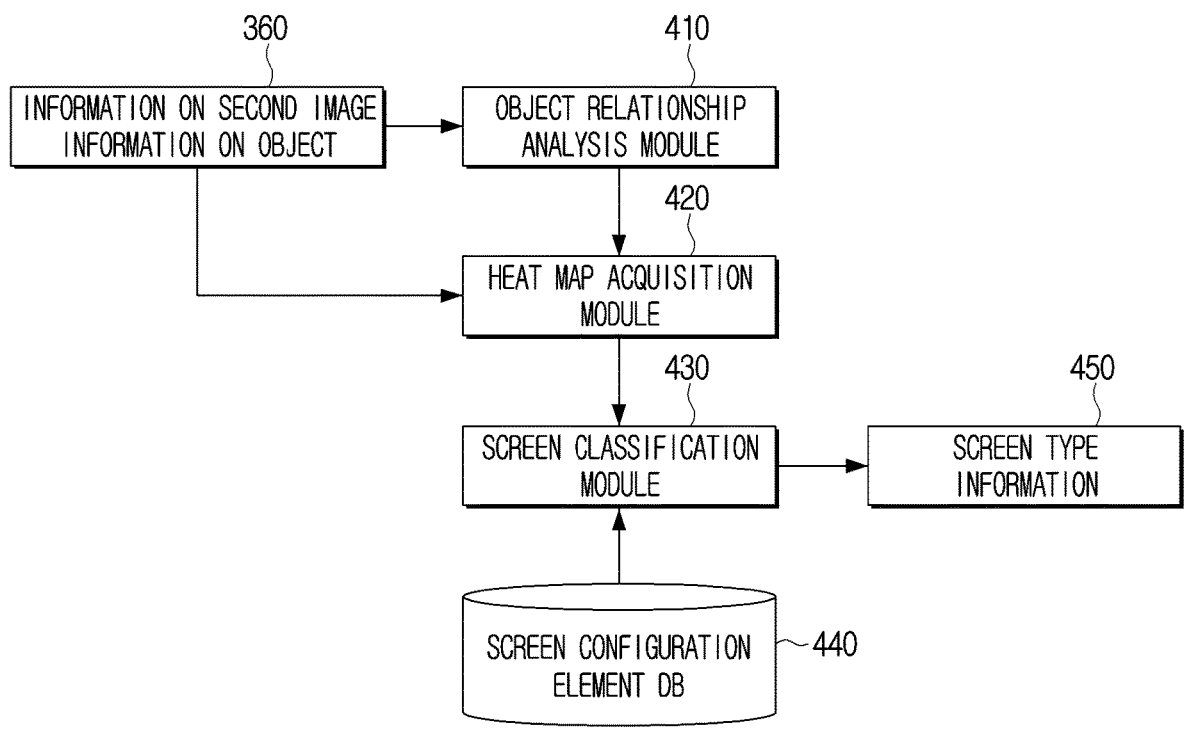
FIG. 4A is a view illustrating an operation of components included in a screen analysis module according to an embodiment.
Figure 4B:
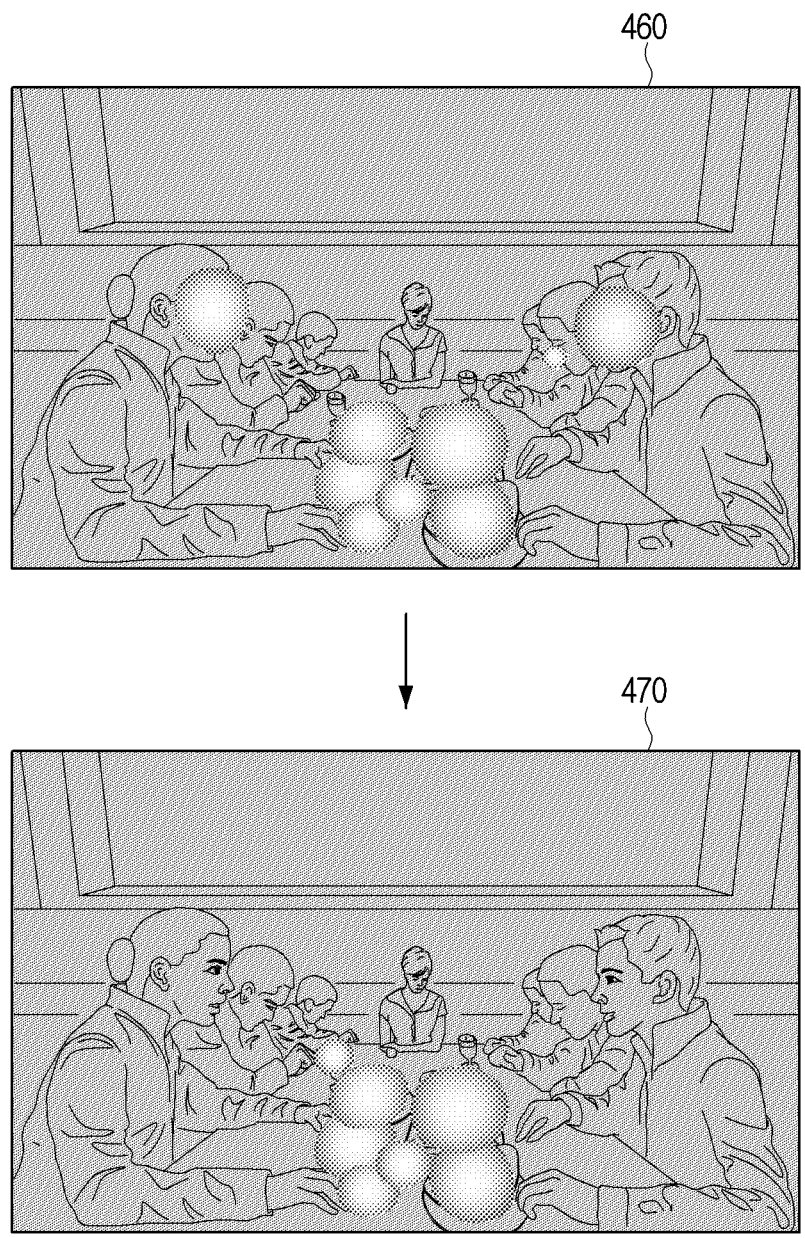
FIG. 4B is a view illustrating a heat map image corresponding to corrected saliency information according to an embodiment.

The saliency information acquisition module 340 may obtain saliency information corresponding to the second image 310 by inputting the second image 310 to a neural network model trained to obtain saliency information corresponding to an image. In this case, the saliency information means information indicating a degree of salience compared to the surroundings of pixels included in the image. In this case, the electronic apparatus 100 may obtain heat map information of the image as illustrated in FIG. 4B based on the obtained saliency information.

In addition, the object posture acquisition module 350 may obtain posture information of at least one object included in the second image 310 by inputting information on at least one object included in segmentation information to a neural network model trained to obtain posture information of an object. In this case, the posture information of at least one object may include not only posture information of objects but also gaze information of the objects.

In addition, the screen element detection module 143 may obtain three dimensional location information of at least one object and information on an area where the at least one object is located based on screen element segmentation information (particularly, object area information, object location information, etc.) and depth map information.

Through the above-described method, the screen element detection module 143 may obtain second image information/object information 360. Specifically, the screen element detection module 143 may obtain saliency information corresponding to the second image 310 and focus information of the second image 310 as information regarding an image (which may be termed "image information"), and obtain type information of an object, posture information of an object, three dimensional location information of an object, and information on an area where an object is located as information regarding an object (which may be termed "object information".

Referring back to FIG. 1, the processor 140 may obtain information regarding a screen type using a screen analysis module 144. Specifically, the screen analysis module 144 may obtain information regarding a screen type by analyzing the screen based on image information and object information obtained through the screen element detection module 143.

Figure 4C:
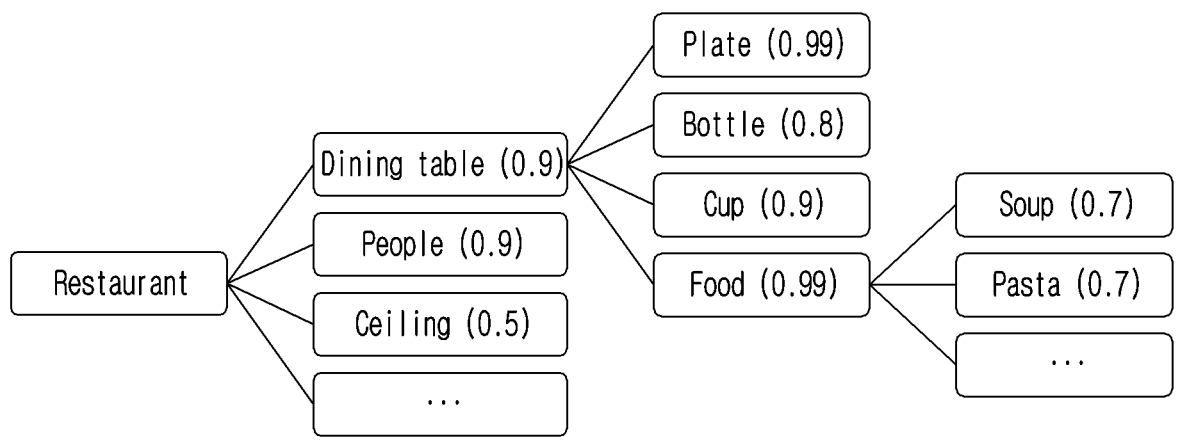
FIG. 4C is a view illustrating a screen configuration element database according to an embodiment.

A method in which the screen analysis module 144 obtains information regarding a screen type using at least one module and a neural network model will be described with reference to FIGS. 4A to 4C. The screen analysis module 144 may include an object relationship analysis module 410, a heat map acquisition module 420 and a screen classification module 430. In this case, the screen analysis module 144 may further include a screen configuration element DB 440, but this is only an example. The screen configuration element DB 440 may exist as another component (e.g., the memory 110) inside the electronic apparatus 100 or may exist outside the electronic apparatus 100.

The object relationship analysis module 410 may obtain relationship information regarding a relationship between objects included in the second image by inputting object information to a neural network model trained to obtain information regarding a relationship between objects. In this case, the relationship between objects may include information about an inclusive relationship between object, information regarding a distribution between objects classified into the same class, and the like.

The heat map acquisition module 420 may correct saliency information by inputting information regarding a relationship between objects, posture information of at least one object, focus information regarding the second image, and saliency information to a neural network model trained to correct saliency information. In other words, the heat map acquisition module 420 may determine the importance of the objects based on the relationship information between objects output from the object relationship analysis module 410, the posture information of objects, the focus information, etc., and may correct the saliency information based on the importance of the objects. In other words, the saliency information may be corrected so that the saliency values of objects determined to be of high importance are increased and the saliency values objects determined to be of low importance are decreased. For example, the heat map acquisition module 420 may obtain a heat map 460 based on the saliency information obtained by the saliency information acquisition module 340 as illustrated in the left side of FIG. 4B. However, the heat map acquisition module 420 may correct the saliency information based on the information regarding a relationship between objects, the posture information of at least one object, and the focus information regarding the second image, and obtain a corrected heat map 470, as illustrated in the right side of FIG. 4B, based on the corrected saliency information. In other words, considering that food is placed in the central area, people's postures or gazes are not directed toward the camera, and the focus of the image is on the food, the food object is determined to be more important than the human object. Thus, as illustrated in the left side of FIG. 4B, the heat map 460 as illustrated in the left side of FIG. 4B may be corrected to the corrected heat map 470 as illustrated in the right side of FIG. 4B.

The screen classification module 430 may obtain information 450 regarding a screen type of the second image based on the second image, corrected heat map information and type information of at least one object. In particular, the screen classification module 430 may identify the screen type of the second image using the screen configuration element DB 440. In this case, the screen configuration element DB 440 is a database for storing a general relationship between screen configuration elements extracted from a large-scale image data set, and may have an upper and lower hierarchical structure as illustrated in FIG. 4C. The numbers shown in each element illustrated in FIG. 4C may be numbers indicating the probability that a higher class would exist in the corresponding element.

For example, the screen classification module 430 may determine a food object which is an object having a high heat value, as an important object based on the corrected heat map information 470 illustrated in the right side of FIG. 4B and the object type information, and determine that the type of the current screen is a restaurant based on information regarding the food object that is determined to be an important object and the screen configuration element DB 440.

Hereinafter, various embodiments in which the screen classification module 430 determines a screen type will be described with reference to FIGS. 5A to 5E.

Figure 5A:
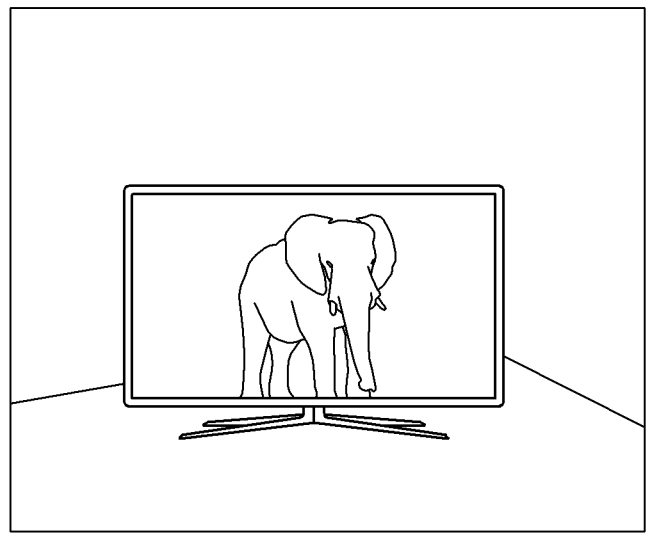
FIGS. 5A to 5E are views illustrating a type of screen identified by an electronic apparatus according to various embodiments.

FIG. 5A is an image in which a picture of an elephant exist in a monitor. Existing object detection-based technology classified the screen type as an animal due to an elephant present in the central area of the screen, but the electronic apparatus 100 according to an embodiment may determine a relationship between the elephant and the monitor and classify the screen type as indoor or an office by determining that a desk and the like exist.

Figure 5B:
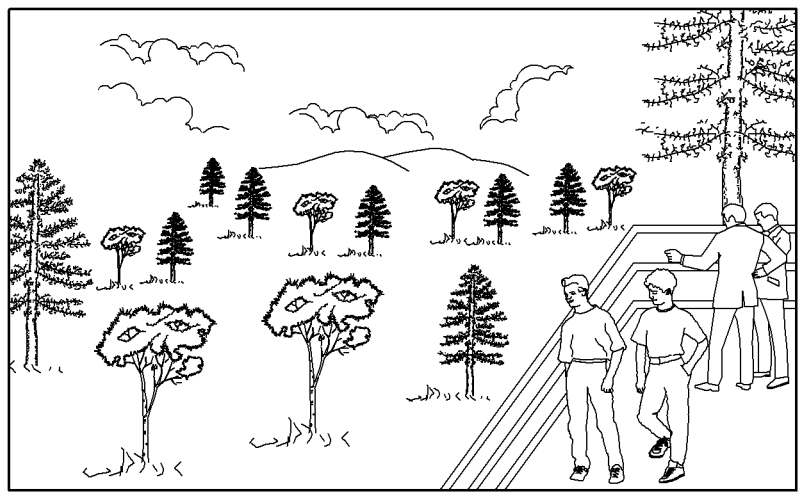

FIG. 5B is an image of a landscape including a plurality of people. Existing object detection-based technology may classify the screen type as a portrait due to people placed on the screen, but the electronic apparatus 100 according to an embodiment may determine posture information (i.e., gaze information) of the people, determine a relationship between the people and the landscape, and determine that the landscape is located in the central area to classify the screen type as a scenery.

Figure 5C:
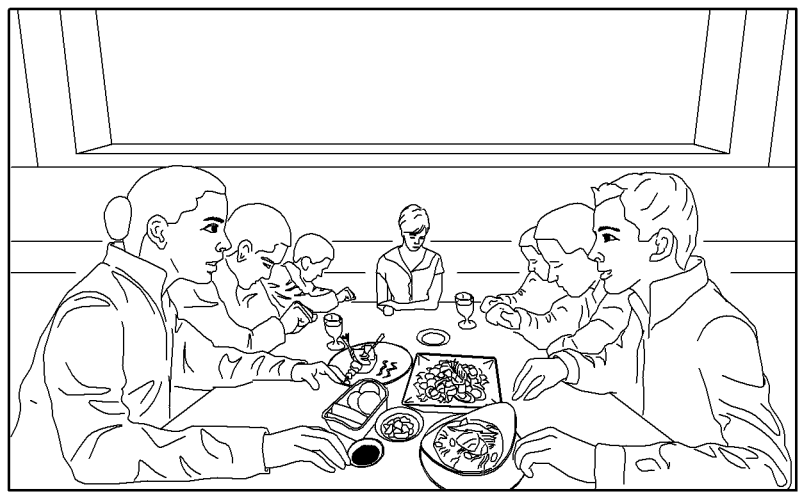

FIG. 5C is an image of a restaurant including a plurality of people. Existing object detection-based technology classified the screen type as a portrait due to the people placed on the screen, but the electronic apparatus 100 according to an embodiment may determine posture information of the people, determine a relationship between the people, food and household items, and determine that the food and the household items are located in the central area to classify the screen type as a restaurant.

Figure 5D:
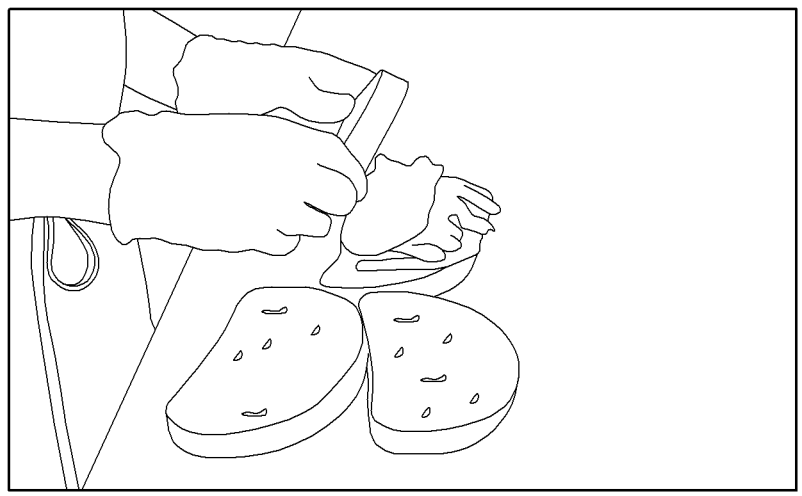

FIG. 5D is an image of making a hamburger. Existing object detection-based technology classified the screen type as a restaurant due to bread and hamburgers placed in the screen, but the electronic apparatus 100 according to an embodiment may determine a relationship between people, and classify the screen type as food.

Figure 5E:

FIG. 5E is an image including people. Existing object detection-based technology classified the screen type as a restaurant due to food placed in the screen, but the electronic apparatus 100 according to an embodiment may determine posture information and gaze information of the people and a relationship between the people and the food and classify the screen type as a portrait.

As illustrated in FIGS. 5A to 5E, conventionally, screen types have been classified simply through representative objects present in an image, but screen types can be classified more accurately by classifying them after analyzing a relationship between objects as shown in an embodiment of the present disclosure.

Referring back to FIG. 1, the processor 140 may correct the first image provided as a live view through the image correction module 145. Specifically, the image correction module 145 may identify a set of filters for correcting the first image based on information regarding a screen type obtained through the screen analysis module 144, and correct the first image provided as a live view using the identified filter set.

According to an embodiment, the image correction module 145 may obtain a set of filters corresponding to a screen type obtained through the screen analysis module 144 from among a plurality of filter sets stored in the memory 110. Specifically, as illustrated in FIG. 6, the memory 110 may store a set of filters for correcting a plurality of image quality factors (e.g., saturation, brightness, white balance (WB), gamma correction, etc.) corresponding to each screen type. In addition, the image correction module 145 may obtain a set of filters corresponding to a screen type obtained through the screen analysis module 144 from among a plurality of filter sets stored in the memory 110. The image correction module 145 may correct the first image provided as a live view based on the obtained filter set.

According to another embodiment, the image correction module 145 may obtain filter set information from an external device (or an external server). Specifically, the image correction module 145 may transmit information regarding a screen type obtained through the screen analysis module 144 to an external device, and obtain filter set information corresponding to the screen type from the external device. The image correction module 145 may correct the first image provided as a live view based on the obtained filter set.

Meanwhile, the processor 140 may control the display 130 to provide information regarding a screen type of the second image together with a live view while providing the corrected first image as a live view. For example, the processor 140 may control the display 130 to provide information of "restaurant mode" together with the corrected first image on the live view screen.

Figure 7A:
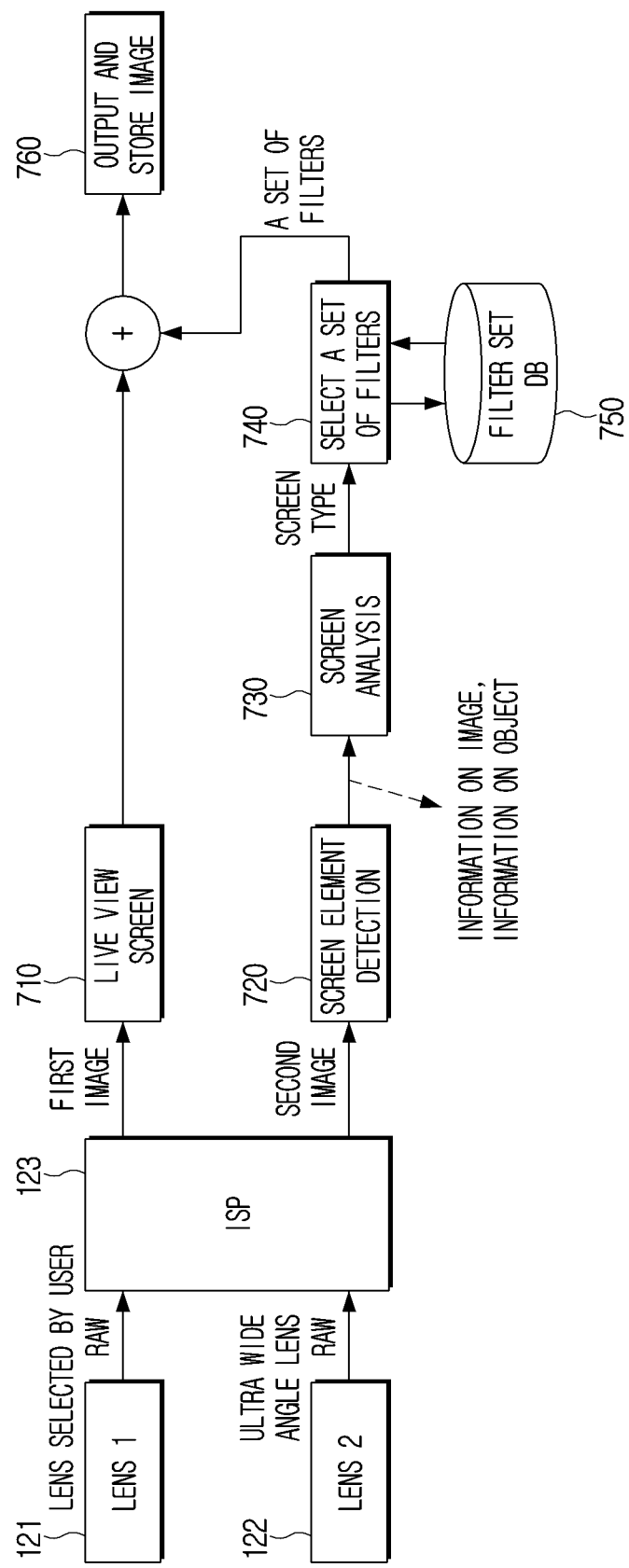
FIGS. 7A and 7B are views illustrating a method of correcting a live view to correspond to a type of screen according to various embodiments.

FIG. 7A is a view provided to explain a method of correcting a live view to correspond to a screen type according to an embodiment.

As illustrated in FIG. 7A, the first lens 121 (a lens selected by a user, a wide angle lens) may obtain raw data using light received through the outside, and output the obtained raw data to an ISP 123. The ISP 123 may obtain the first image by processing the obtained raw data, and the electronic apparatus 100 may provide, at 710, the obtained first image as a live view screen.

While the first image obtained through the first lens 121 is provided as a live view screen, the second lens 122 (an ultra wide angle lens) may also obtain raw data using light received through the outside, and output the obtained raw data to the ISP 123. The ISP 123 may obtain the second image by processing the obtained raw data.

As illustrated in FIGS. 1 and 3, the electronic apparatus 100 may detect, at 720, a screen element using at least one neural network model. In this case, the electronic apparatus 100 may output information regarding an image and information regarding an object as information regarding a screen element.

As described in FIG. 1 and FIGS. 4A to 5E, the electronic apparatus 100 may analyze, at 730, a screen based on information regarding an image and information regarding an object. In this case, the electronic apparatus 100 may obtain information regarding a screen type by determining a relationship between objects based on the information regarding an image and the information regarding an object.

The electronic apparatus 100 may select, at 740, a set of filters corresponding to the screen type from among a plurality of filter sets stored in a filter set DB 750. The electronic apparatus 100 may output and store, at 760, the first image by correcting the first image provided as a live view screen using the selected filter set. In other words, the electronic apparatus 100 may correct the first image provided as a live view screen in real time, and based on a photographing command being input, the first image which is corrected by applying a set of filters to the first image photographed at a time based on the photographing command being input may be stored in the memory 110 (particularly, a gallery folder in the memory 110).

Figure 7B:
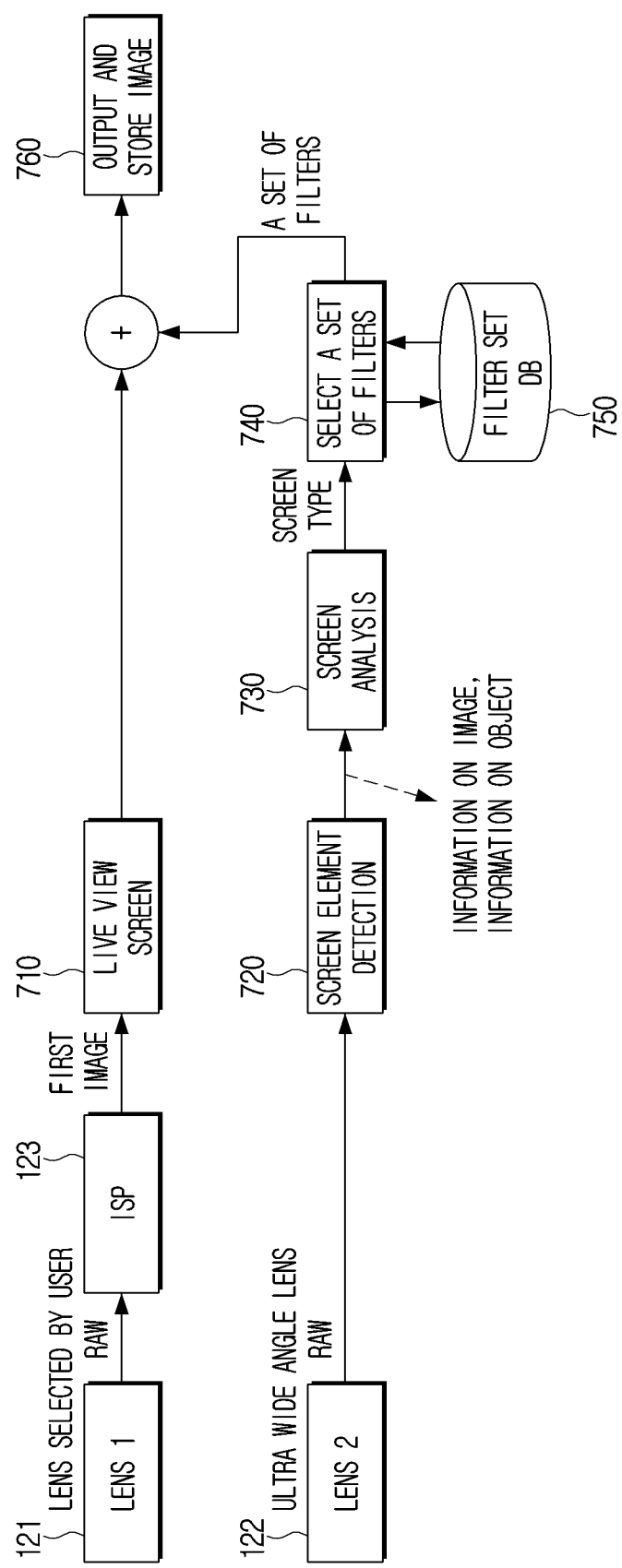

FIG. 7B is a view provided to explain a method of correcting a live view to correspond to a screen type according to another embodiment.

In FIG. 7B, unlike FIG. 7A, raw data obtained through the second lens 122 need not be input to the ISP 123, and a screen element may be detected, at 720, using the raw data. In other words, as illustrated in FIG. 7B, as a screen element is detected by directly using the raw data, power consumption required for processing the ISP 123 can be reduced, and heat generation can also be reduced.

Figure 8:
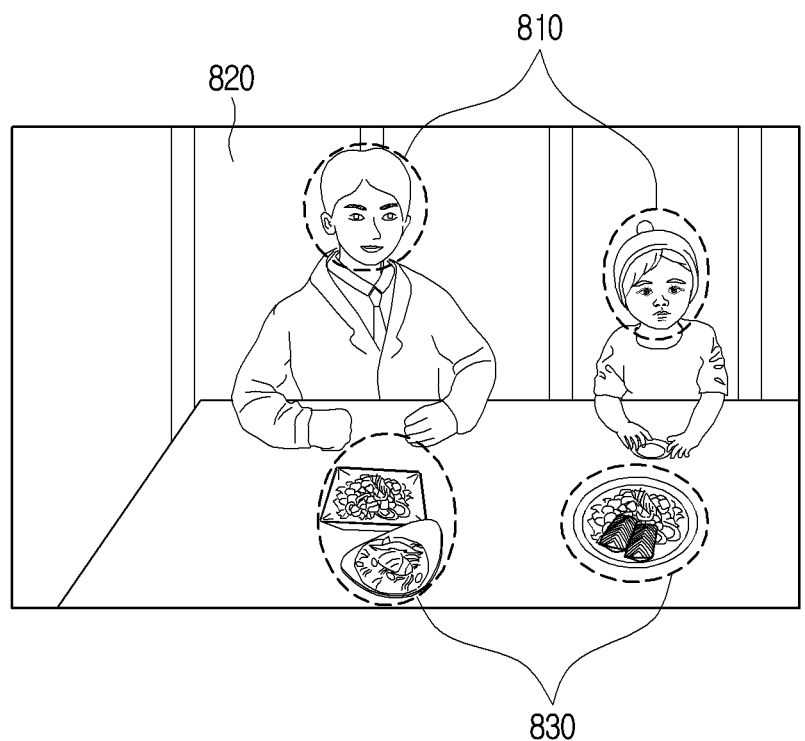
FIG. 8 is a view illustrating application of different filter sets to each of a plurality of areas included in an image according to an embodiment.

In the above-described embodiments, it is described that a screen type for the entire screen is determined and the screen is corrected through a set of filters corresponding to the screen type, but they are only exemplary embodiments. The screen may be divided into a plurality of areas, and the screen may be corrected using a plurality of filter sets corresponding to each of the plurality of divided areas. For example, as illustrated in FIG. 8, the electronic apparatus 100 may segment an image into a first area 810, a second area 820 and a third area 830. The electronic apparatus may identify a first filter set for correcting a person object corresponding to the segmented first area 810, a second filter set for correcting a background corresponding to the segmented second area 820 and a third filter set for correcting a food object corresponding to the segmented third area 830. Subsequently, the electronic apparatus 100 may correct the first area 810 using the first filter set, correct the second area 820 using the second filter set and correct the third area 830 using the third filter set.

Figure 9:
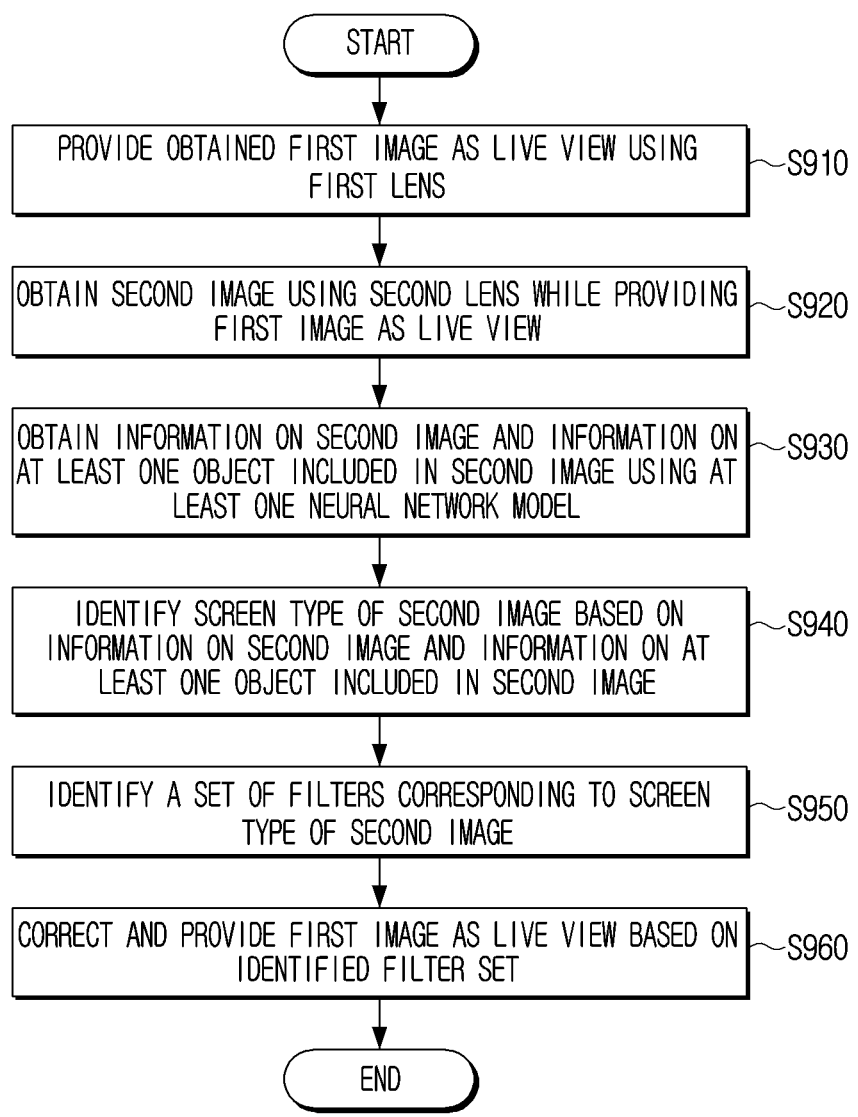
FIG. 9 is a flowchart illustrating a controlling method of an electronic apparatus according to an embodiment.

FIG. 9 is a flowchart provided to explain a controlling method of an electronic apparatus according to an embodiment.

The electronic apparatus 100 may provide the first image obtained using the first lens as a live view (S910). In this case, the first lens is a lens selected by the user, and may be, for example, a wide angle lens.

The electronic apparatus 100 may obtain the second image using the second lens while providing the first image as a live view (S920). In this case, the second lens is a lens capable of obtaining an image with a wider angle of view than the first lens, and may be, for example, an ultra wide angle lens.

The electronic apparatus 100 may obtain information regarding the second image using at least one neural network model and information regarding at least one object included in the second image (S930). In this case, the information regarding the second image include depth map information corresponding to the second image, saliency information corresponding to the second image, focus information of the second image, etc., and particularly, the electronic apparatus 100 may obtain the depth map information by inputting the second image to the first neural network model, and obtain the saliency information by inputting the second image to the second neural network model. In addition, the information regarding at least one object included in the second image may include type information of the at least one object, three dimensional location information of the at least one object, information regarding an area where the at least one object is located and posture information of the at least one object. In particular, the electronic apparatus 100 may obtain segmentation information in which at least one object and a background included in the second image are segmented by inputting the second image to the third neural network model and type information of the at least one object. In addition, the electronic apparatus 100 may obtain the three dimensional location information of the at least one object and the information regarding an area where the at least one object is located based on the segmentation information and the depth map information. Further, the electronic apparatus 100 may obtain the posture information of the at least one object by inputting information regarding at least one object included in the segmentation information to the fourth neural network model.

The electronic apparatus 100 may identify a screen type of the second image based on the information regarding the second image and the information regarding at least one object included in the second image (S940). Specifically, the electronic apparatus 100 may obtain relationship information between at least one object by inputting three dimensional location information of an object and information regarding an area where the object is located to the fifth neural network model. The electronic apparatus 100 may obtain corrected saliency information by inputting the relation information, the posture information of at least one object, the focus information regarding the second image, and the saliency information to the sixth neural network model, and obtain heat map information based on the obtained saliency information. The electronic apparatus 100 may identify a screen type of the second image based on the second image, the heat map information and the type information of at least one object.

The electronic apparatus 100 may identify a set of filters corresponding to the screen type of the second image (S950). Specifically, the electronic apparatus 100 may identify a filter set corresponding to the screen type from among a plurality of filter sets stored in the electronic apparatus 100.

The electronic apparatus 100 may correct the first image based on the identified filter set and provide the same as a live view (S960). In this case, the electronic apparatus 100 may provide information regarding the screen type on the live view while providing the corrected first image as the live view.

Figure 10:
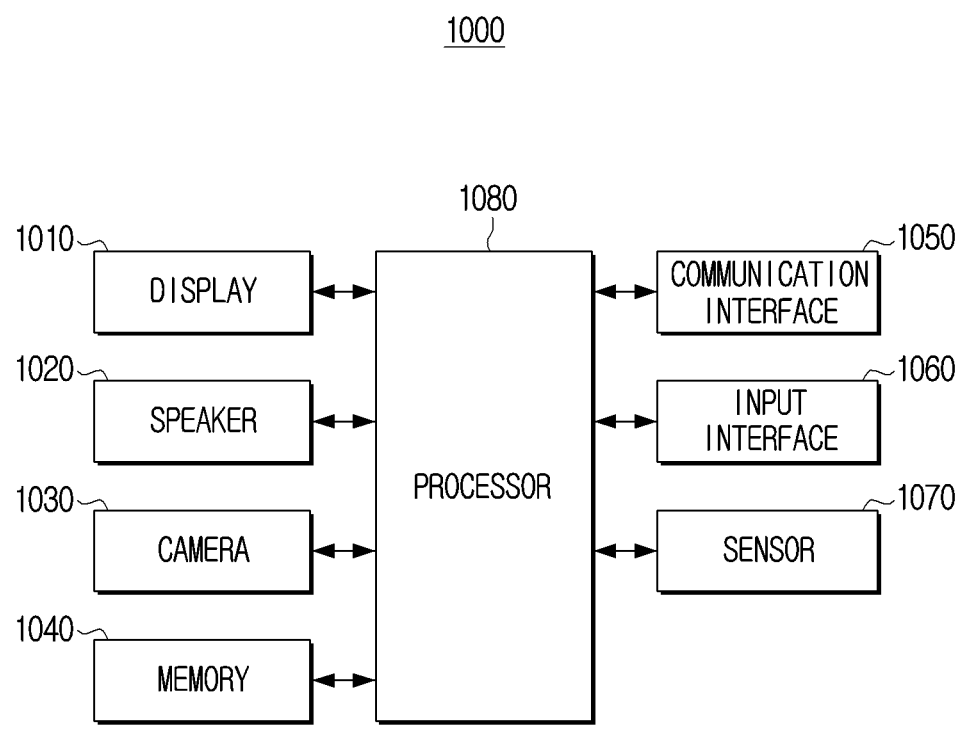
FIG. 10 is a block diagram illustrating components of an electronic apparatus according to an embodiment.

FIG. 10 is a block diagram provided to explain configuration of an electronic apparatus according to an embodiment. As illustrated in FIG. 10, an electronic apparatus 1000 according to an embodiment may include a display 1010, a speaker 1020, a camera 1030, a memory 1040, a communication interface 1050, an input interface 1060, a sensor 1070, and a processor 1080. However, such configuration is only an example, and new configuration may be added or some configuration may be omitted. Meanwhile, since the display 1010, the camera 1030, the memory 1040, and the processor 1080 are the same as or substantially similar to the display 130, the camera 120, the memory 110, and the processor 140 described in FIG. 1, overlapping descriptions will be omitted.

The speaker 1020 may output a voice message. In particular, the speaker 1020 may provide a guide message including information regarding a screen type in the form of a voice message. In this case, the speaker 1020 may be included in the electronic apparatus 1000, but this is only an example. The speaker 1020 may be electrically connected to the electronic apparatus 1000 and may be located outside the electronic apparatus 1000.

The communication interface 1050 includes a circuit, and may perform communication with an external device. Specifically, the processor 1080 may receive various data or information from a connected external device through the communication interface 1050, and transmit various data or information to the external device.

The communication interface 1050 may include at least one of a WiFi module, a Bluetooth module, a wireless communication module, or an NFC module. Specifically, each of the WiFi module and the Bluetooth module may perform communication in a WiFi method and a Bluetooth method, respectively. Based on the Wi-Fi module or the Bluetooth module being used, various types of connection information such as a service set identifier (SSID) may be transmitted or received, communication may be established using the various connection information, and thereafter various types of information may be transmitted or received.

In addition, the wireless communication module may perform communication according to various communication standards such as IEEE, Zigbee, 3rd Generation (3G), 3rd Generation Partnership Project (3GPP), Long Term Evolution (LTE), 5th Generation (5G), etc. The NFC module may perform communication in a Near Field Communication (NFC) that uses a 13.56 MHz band among various radio frequency-identification (RF-ID) frequency bands such as 135 kHz, 13.56 MHz, 433 MHz, 860 to 960 MHz, and 2.45 GHz.

In particular, in various embodiments according to the present disclosure, the communication interface 1050 may receive various kinds of information such as data related to a neural network model (of, for example, a screen analysis module 144) from an external device. In addition, the communication interface 1050 may transmit information regarding a screen type to an external device and receive information regarding a set of filters corresponding to the screen type from the external device.

The input interface 1060 includes a circuit, and the processor 1080 may receive a user command for controlling the operation of the electronic apparatus 1000 through the input interface 1060. Specifically, the input interface 1060 may be implemented in a form in which it is included in the display 1010, but this is only an example. The input interface 1060 may consist of a button, a microphone, a remote control receiver (not illustrated) and the like.

In particular, in various embodiments according to the present disclosure, the input interface 1060 may receive various user commands such as a user command for executing a camera application, a user command for photographing an image, a user command for correcting a live view screen with a set of filters corresponding to a current screen type, and the like.

The sensor 1070 may obtain various information regarding the electronic apparatus 1000. In particular, the sensor 1070 may include a GPS capable of obtaining location information of the electronic apparatus 1000, and it may include various sensors such as a biometric sensor (e.g., a heartbeat sensor, a PPG sensor, etc.), a motion sensor for detecting a motion of the electronic apparatus 1000, and the like.

The processor 1080 may control the electronic apparatus 1000 according to at least one instruction stored in the memory 1040. In particular, the processor 1080 may provide the first image obtained using the first lens 121 to the display 1010 as a live view, obtain the second image using the second lens 122 while providing the first image as a live view, obtain information regarding the second image using at least one neural network model and information regarding at least one object included in the second image, identify a screen type of the second image based on the information regarding at least one object included in the second image, identify a set of filters corresponding to the screen type of the second image, and correct the first image provided as a live view based on the identified filter set.

Meanwhile, in the above-described embodiment, it is described that the electronic apparatus 100 identifies a screen type based on a relationship between objects in an image photographed using a plurality of lenses and the photographed image is corrected based on a set of filters corresponding to the identified screen type, but this is only an example. The currently captured image can be corrected in association with an external server, which will be described in detail with reference to FIG. 11.

Firstly, the electronic apparatus 100 may provide the first image obtained using the first lens as a live view (S1110).

Subsequently, the electronic apparatus 100 may obtain the second image using the second lens while providing the first image as a live view (S1120). In this case, the second lens may be a lens capable of obtaining an image with a wider angle of view than the first lens.

The electronic apparatus 100 may transmit the obtained second image to a server 1100 (S1130). In this case, as illustrated in FIG. 7A, the second image may be an image processed through the ISP 123, but this is only an example. The second image may be raw data as described in FIG. 7B.

The server 1100 may obtain information regarding the second image and information regarding at least one object included in the second image using at least one neural network model (S1140).

The server 1100 may identify a screen type of the second image based on the information regarding the second image and the information regarding at least one object included in the second image (S1150).

The server 1100 may identify a set of filters corresponding to the screen type of the second image (S1160). Specifically, the server 1100 may identify a set of filters corresponding to the screen type of the second image from among a plurality of filter sets stored in the server 1100.

The server 1100 may transmit the identified filter set to the electronic apparatus 100 (S1170).

The electronic apparatus 100 may correct the first image based on the filter set transmitted from the server 1100 and provide the same as a live view (S1180). In this case, the electronic apparatus 100 may provide information regarding the screen type on the live view while providing the corrected first image as the live view, and may store the corrected first image captured at a time based on a photographing command being input.

According to another embodiment, the electronic apparatus 100 may transmit both the first image and the second image to the server 1100, and the server 1100 may identify filter set information based on the second image and correct the first image based on the identified filter set information. In addition, the server 1100 may transmit the corrected first image to the electronic apparatus 100, and the electronic apparatus 100 may immediately provide the corrected first image received from the server 1100.

Meanwhile, the function related to a neural network model as in the above description may be performed through a memory and a processor. The processor may consist of one or more processors. In this case, the one or more processors may be general-purpose processors such as a CPU and an AP, graphics-only processors such as a graphics processing unit (GPU) and a vision processing unit (VPU), or AI-only processors, such as a neural processing unit (NPU). One or more processors control input data to be processed according to predefined operation rules or AI models stored in a non-volatile memory and a volatile memory. The predefined operation rules or AI models are characterized in that they are created through learning.

Here, being created through learning means that a predefined operation rule or an AI model having desired characteristics is created by applying a learning algorithm to a plurality of learning data. Such learning may be performed in a device itself in which AI according to the disclosure is performed, or may be performed through a separate server/system.

An AI model may include a plurality of neural network layers. Each of the plurality of neural network layers has a plurality of weight values, and a neural network operation is performed through an operation result of a previous layer and an operation of a plurality of weight values. Examples of neural network layers include a convolutional neural network (CNN), a deep neural network (DNN), a recurrent neural network (RNN), a restricted Boltzmann machine (RBM), a deep belief network (DBN), a bidirectional recurrent deep neural networks (BRDNN), a Generative Adversarial Networks (GAN), and deep Q-networks, and the like, and the neural networks in the disclosure are not limited to the above examples except for the cases specified.

A learning algorithm is a method of training a predetermined target device (e.g., a robot) using a plurality of learning data so that the predetermined target device can make a decision or make a prediction by itself. Examples of learning algorithms include supervised learning, unsupervised learning, semi-supervised learning, or reinforcement learning, but are not limited to the above examples except for the cases specified in the present disclosure.

A machine-readable storage medium may be provided in the form of a non-transitory storage medium. Here, the term 'non-transitory storage medium' refers to a tangible device and should be understood to not include a signal (e.g., an electromagnetic wave) but is not intended to distinguish between a case in which data is semi-permanently stored in the storage medium and a case in which data is temporarily stored in the storage medium. For example, the 'non-transitory storage medium' may include a buffer in which data is temporarily stored.

In an embodiment, methods according to various embodiments as set forth herein may be provided by being included in a computer program product. The computer program product may be traded as a product between a seller and a purchaser. The computer program product may be distributed in the form of a storage medium (e.g., compact disc read only memory (CD-ROM)) that is readable by devices, may be distributed through an application store (e.g., Play Store™) or directly between two user devices (e.g., smartphones), or may be distributed online (e.g., by downloading or uploading). In the case of an online distribution, at least part of the computer program product (e.g., a downloadable application) may be at least temporarily stored in a machine-readable storage medium such as a server of the manufacturer, a server of an application store, or a memory of a relay server or may be temporarily generated.

Each component (e.g., a module or a program) of various embodiments of the disclosure as described above may include a single entity or a plurality of entities, and some of the sub-components described above may be omitted or other sub-components may be further included in various embodiments. Alternatively or additionally, some components (e.g., modules or programs) may be integrated into one entity to perform functions, which are performed by the components prior to the integration, in the same or similar manner.

Operations performed by a module, a program, or another component according to various embodiments may be performed in a sequential, parallel, iterative, or heuristic manner, or at least some of the operations may be performed in a different order or omitted, or other operations may be added.

Meanwhile, the term "part" or "module" used herein includes a unit configured as hardware, software, or firmware, and may be used interchangeably with terms such as logic, logic block, component, or circuit. A "part" or "module" may be understood as an integral component or a minimum unit for performing one or more functions or part of the minimum unit. For example, a module may be configured as an application-specific integrated circuit (ASIC).

Various embodiments of the disclosure may be implemented by software including instructions stored in a machine (e.g., a computer) readable storage medium. The machine is a device capable of calling an instruction stored in a storage medium and operating according to the called instruction and may include an electronic apparatus (e.g., the electronic apparatus 100) according to various embodiments set forth herein.

Based on the instruction being executed by a processor, a function corresponding to the instruction may be performed directly by the processor or under control of the processor. The instructions may include code generated or executed by a compiler or an interpreter.

While embodiments of the disclosure have been illustrated and described herein, the disclosure is not limited thereto and variously modifications may be made therein by those of ordinary skill in the art without departing from the gist of the disclosure as claimed in the accompanying claims. These modifications should not be understood separately from the scope and spirit of the disclosure.

What is claimed is:

1. An electronic apparatus comprising:
   a camera including a first lens and a second lens capable of obtaining an image having an angle of view different from the first lens;
   a display;
   a memory; and
   a processor configured to:
      provide a first image obtained using the first lens to the display as a live view;
      obtain a second image using the second lens while providing the first image as the live view;
      obtain image information regarding the second image and object information regarding at least one object depicted in the second image using at least one neural network model;
      identify a screen type of the second image based on the image information and the object information;
      identify a set of filters corresponding to the screen type of the second image; and
      correct the first image based on the identified set of filters to provide a corrected first image as the live view.

2. The apparatus as claimed in claim 1, wherein the image information comprises depth map information corresponding to the second image and saliency information corresponding to the second image; and
   wherein the processor is further configured to obtain the depth map information by inputting the second image to a first neural network model, and obtain the saliency information by inputting the second image to a second neural network model.

3. The apparatus as claimed in claim 2, wherein the object information comprises at least one of type information of the at least one object, three-dimensional location information of the at least one object, area information regarding an area where the at least one object is located, and posture information of the at least one object; and
   wherein the processor is further configured to perform at least one of:
      obtain segmentation information in which the at least one object and a background included in the second image are segmented by inputting the second image to a third neural network model;
      obtain the type information by inputting the second image to the third neural network model;

obtain at least one of the three-dimensional location information and the area information based on the segmentation information and the depth map information; and obtain the posture information by inputting information regarding the at least one object included in the segmentation information to a fourth neural network model.

4. The apparatus as claimed in claim 3, wherein the processor is further configured to obtain relationship information between a plurality of objects depicted in the second image comprising the at least one object, by inputting the three-dimensional location information and the area information of each object of the plurality of objects to a fifth neural network model.

5. The apparatus as claimed in claim 4, wherein the processor is further configured to obtain heat map information corresponding to corrected saliency information by inputting the relationship information, the posture information of the at least one object, focus information regarding the second image, and the saliency information to a sixth neural network model.

6. The apparatus as claimed in claim 5, wherein the processor is further configured to identify the screen type of the second image based on the second image, the heat map information, and the type information of the at least one object.

7. The apparatus as claimed in claim 1, wherein the memory stores a plurality of sets of filters respectively corresponding to a plurality of screen types; and wherein the processor is further configured to identify the set of filters corresponding to the screen type of the second image from among the plurality of sets of filters.

8. The apparatus as claimed in claim 1, wherein the processor is further configured to control the display to provide information regarding the screen type on the live view together with the corrected first image.

9. The apparatus as claimed in claim 1, wherein the second lens is capable of obtaining an image having a wider angle of view than the first lens.

10. A controlling method of an electronic apparatus comprising a camera including a first lens and a second lens capable of obtaining an image having a wider angle of view than the first lens, the method comprising:

providing a first image obtained using the first lens as a live view;

obtaining a second image using the second lens while providing the first image as the live view;

obtaining image information regarding the second image and object information regarding at least one object depicted in the second image using at least one neural network model;

identifying a screen type of the second image based on the image information and the object information;

identifying a set of filters corresponding to the screen type of the second image; and correcting the first image based on the identified set of filters to provide a corrected first image as the live view.

11. The method as claimed in claim 10, wherein the image information comprises depth map information corresponding to the second image and saliency information corresponding to the second image; and wherein the obtaining of the image information comprises obtaining the depth map information by inputting the second image to a first neural network model, and obtaining the saliency information by inputting the second image to a second neural network model.

12. The method as claimed in claim 11, wherein the object information comprises at least one of type information of the at least one object, three-dimensional location information of the at least one object, area information regarding an area where the at least one object is located, and posture information of the at least one object; and wherein the obtaining of the object information comprises at least one of:

obtaining segmentation information in which the at least one object and a background included in the second image are segmented by inputting the second image to a third neural network model;

obtaining the type information by inputting the second image to the third neural network model;

obtaining at least one of the three-dimensional location information and the area information based on the segmentation information and the depth map information; and obtaining the posture information by inputting information regarding the at least one object included in the segmentation information to a fourth neural network model.

13. The method as claimed in claim 12, wherein the identifying of the screen type of the second image comprises obtaining relationship information between a plurality of objects depicted in the second image comprising the at least one object, by inputting the three-dimensional location information and the area information of each object of the plurality of objects to a fifth neural network model.

14. The method as claimed in claim 13, wherein the identifying of the screen type of the second image comprises obtaining heat map information corresponding to corrected saliency information by inputting the relationship information, the posture information of the at least one object, focus information regarding the second image, and the saliency information to a sixth neural network model.

15. The method as claimed in claim 14, wherein the identifying of the screen type of the second image is based on the second image, the heat map information, and the type information of the at least one object.

16. The method as claimed in claim 10, wherein the memory stores a plurality of sets of filters respectively corresponding to a plurality of screen types, and wherein the identifying the set of filters further comprises:

identifying the set of filters corresponding to the screen type of the second image from among the plurality of sets of filters.

17. The method as claimed in claim 10, wherein the method further comprises:

providing information regarding the screen type on the live view together with the corrected first image.

18. The method as claimed in claim 10, wherein the second lens is capable of obtaining an image having a wider angle of view than the first lens.

* * * * *